(12) United States Patent
Brown et al.

(10) Patent No.: US 7,737,216 B2
(45) Date of Patent: Jun. 15, 2010

(54) MONOVINYLARENE CONJUGATED DIENE BLOCK COPOLYMER COMPOSITIONS FOR SHRINKABLE FILMS

(75) Inventors: John M Brown, Mooresville, NC (US); Carleton E Stouffer, Bartlesville, OK (US); John D Wilkey, Owasso, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 189 days.

(21) Appl. No.: 11/340,122

(22) Filed: Jan. 26, 2006

(65) Prior Publication Data

US 2007/0173605 A1 Jul. 26, 2007

(51) Int. Cl.
  *C08J 5/18* (2006.01)
  *C08F 297/04* (2006.01)
  *C08L 53/02* (2006.01)

(52) U.S. Cl. .................... 525/89; 525/98; 525/271; 525/314

(58) Field of Classification Search ............... 525/89, 525/271, 314, 98
See application file for complete search history.

(56) References Cited

U.S. PATENT DOCUMENTS

| | | | |
|---|---|---|---|
| 3,639,517 A | 2/1972 | Kitchen et al. | |
| 4,086,298 A | 4/1978 | Fahrbach et al. | |
| 4,089,913 A | 5/1978 | Miki et al. | |
| 4,091,053 A | 5/1978 | Kitchen et al. | |
| 4,120,915 A | 10/1978 | Fodor et al. | |
| 4,122,134 A | 10/1978 | Miki et al. | |
| 4,167,545 A | 9/1979 | Fahrbach et al. | |
| 4,386,125 A * | 5/1983 | Shiraki et al. | 428/35.1 |
| 4,386,190 A | 5/1983 | Bailey | |
| 4,418,180 A | 11/1983 | Heinz et al. | |
| 4,433,109 A | 2/1984 | Takeuchi et al. | |
| 4,603,155 A | 7/1986 | Muramori et al. | |
| 4,939,208 A | 7/1990 | Lanza et al. | |
| 5,436,298 A | 7/1995 | Moczygemba et al. | |
| 5,587,425 A * | 12/1996 | Moczygemba et al. | 525/98 |
| 5,705,569 A | 1/1998 | Moczygemba et al. | |
| 5,854,353 A | 12/1998 | Knoll et al. | |
| 6,031,053 A | 2/2000 | Knoll et al. | |
| 6,107,411 A * | 8/2000 | Toya et al. | 525/316 |
| 6,521,712 B1 | 2/2003 | Knoll et al. | |
| 6,841,261 B2 | 1/2005 | Matsui et al. | |
| 7,189,462 B2 * | 3/2007 | Matsui et al. | 428/517 |
| 2003/0013826 A1 | 1/2003 | Li et al. | |
| 2003/0088004 A1 * | 5/2003 | Hoshi et al. | 524/287 |
| 2003/0166774 A1 * | 9/2003 | Hoshi et al. | 525/88 |
| 2003/0176582 A1 | 9/2003 | Bening et al. | |
| 2004/0039128 A1 * | 2/2004 | Sasagawa et al. | 525/331.9 |
| 2004/0102576 A1 * | 5/2004 | Matsui et al. | 525/180 |
| 2005/0222331 A1 * | 10/2005 | Hoshi et al. | 525/88 |
| 2006/0211818 A1 | 9/2006 | Kurimura et al. | |
| 2007/0027257 A1 | 2/2007 | Kobashi et al. | |
| 2007/0043168 A1 | 2/2007 | Montiel-Ortiz et al. | |
| 2007/0093601 A1 | 4/2007 | Watanabe et al. | |
| 2007/0098933 A1 | 5/2007 | Opuszko et al. | |

FOREIGN PATENT DOCUMENTS

| | | |
|---|---|---|
| DE | 19917675 | 10/2000 |
| EP | 0058952 A1 | 9/1982 |
| EP | 0251047 A | 1/1988 |
| EP | 0852240 A1 | 7/1998 |
| EP | 1229059 A1 | 8/2002 |
| EP | 1333043 A1 | 8/2003 |
| EP | 0761704 B2 | 5/2004 |
| EP | 1550690 * | 6/2005 |
| WO | WO 02/057386 A2 | 7/2002 |

OTHER PUBLICATIONS

Goto et al., electronic translation of specification of JP 2000-026698, Jan. 2000.*
Hsieh, Henry L., et al., "Kinetics of alkyllithium initiated polymerizations", Rubber Chemistry and Technology, (1970), 43(1), 22-73.
Kraus, Gerald, et al., "Morphology and dynamic viscoelastic behavior of blends of styrene-butadiene block copolymers", Adv. Chem. Ser., (1979), 176, 277-292.
Knoll, Konrad, et al. "Styrolux and styroflex. From transparent high impact polystyrene to new thermoplastic elastomers. Syntheses, applications, and blends with other styrene -based polymers", Macromolecular Symposia (1998), 132 (international Symposium on Ionic Polymerization, 1997), 231-243.
International Search Report & Written Opinion, PCT/US07/061057, Jun. 13, 2007, 11 pages.

* cited by examiner

*Primary Examiner*—Jeffrey C Mullis
(74) *Attorney, Agent, or Firm*—Fletcher Yoder

(57) ABSTRACT

The present invention relates generally to monovinylarene-conjugated diene block copolymers adapted for shrinkable film applications. In one embodiment, a block copolymer is provided wherein an oriented 2 mil film of the block copolymer oriented at 100° C. or less exhibits less than 10% shrinkage at 70° C., and at least 70% shrinkage at 100° C.

18 Claims, No Drawings

MONOVINYLARENE CONJUGATED DIENE BLOCK COPOLYMER COMPOSITIONS FOR SHRINKABLE FILMS

BACKGROUND OF THE INVENTION

The present invention relates generally to monovinylarene-conjugated diene block copolymers adapted for shrinkable film applications.

Monovinylarene-conjugated diene block copolymers are increasingly used in shrinkable film applications. Typically, a film is "oriented", i.e., stretched, at an "orientation" temperature high enough to allow it to be stretched to a film of desired thickness without breaking. As an example, orientation temperatures are generally less than 100° C., and films having a thickness of 2 mil are common.

The film should generally retain its stretched orientation at ambient temperatures, thus avoiding "natural shrinkage" during storage. A common specification for natural shrinkage is that a film should not shrink more than 5% when stored at 40° C. for 7 days. In the context of shrink films, percent shrinkage refers to the change in dimension of an oriented film compared to its oriented shape. Upon application, the film can be shrunk around an object at an elevated "activation" temperature, which can be around 100° C., as an example.

It is generally desirable that a shrink film be substantially clear. A common specification in such cases is that a film should have a haze of less than 5% (BYK Gardner Haze-Gard Plus according to ASTM D-1003 (1992) using test specimens of 2 mil thickness).

There is a continuing need for compositions and methods directed at achieving objectives including the foregoing, particularly in a cost efficient manner.

SUMMARY OF THE INVENTION

Monovinylarene-conjugated diene block copolymers are provided that are adapted for shrinkable film applications. In general, 2 mil oriented films are taken as a reference point for the performance of block copolymers under the present invention. Those of skill in the art will appreciate that other film configurations from the inventive block copolymers are also possible.

As one example, the invention provides a block copolymer suitable to form a 2 mil film oriented at 80° C. or less that exhibits at least 50% shrinkage at 80° C. As another example, the invention provides a block copolymer suitable to form a 2 mil film oriented at 100° C. or less that exhibits less than 10% shrinkage at 70° C., and at least 70% shrinkage at 100° C. As another example, the invention provides a block copolymer suitable to form a 2 mil film oriented at 80° C. or more that exhibits less than 17% shrinkage at 70° C., at least 42% shrinkage at 80° C., and at least 73% shrinkage at 100° C.

Some embodiments can provide lower orientation temperatures, e.g., 75° C. or less, or even 70° C. or less. Some embodiments can have low haze, e.g., no more than 5%. Some embodiments can have low natural shrinkage, e.g., no more than 5%. Some embodiments can provide high shrinkage at 100° C., e.g., at least 70%, or at least 75%.

In addition to being defined by performance characteristics, some embodiments of block copolymers under the invention can include various compositional features. In some embodiments, the block copolymer comprises an initial monovinylarylene block that is 15-30 wt % of the block copolymer. In some embodiments, the block copolymer comprises 20-30 wt % conjugated diene. In some embodiments, the block copolymer is coupled. In some embodiments, the block copolymer comprises a random mixed block of monovinylarylene and conjugated diene. In some embodiments, this random mixed block comprises 4-9 times as much monovinylarylene as conjugated diene.

Some embodiments of block copolymers under the invention can also include various structural features. As examples, in some embodiments, suitable block copolymers can be formed through any of the following charge orders: i-A-B-C-CA; i-A-B-C-A-CA; i-A-C-B-CA; and i-A-i-C-B-CA, where "i" is a polymerization initiator charge; "A" is a monovinylarylene charge; "B" is a conjugated diene charge; "C" is a random mixed block of monovinylarylene and conjugated diene; and "CA" is a coupling agent. Such structural definitions in terms of charge order are intended as helpful illustrations. It will be appreciated that similar or identical structures can be derived by other means, including modifications of reactant additions and polymerization conditions, and that such block copolymers are also part of the invention.

Advantages and other features of the invention will become apparent from the following description and from the claims.

DESCRIPTION OF ILLUSTRATIVE EMBODIMENTS

The basic starting materials and polymerization conditions for preparing monovinylarene-conjugated diene block copolymers are disclosed in, e.g., U.S. Pat. Nos. 4,091,053; 4,584,346; 4,704,434; 4,704,435; 5,130,377; 5,227,419; 6,265,484; 6,265,485; 6,420,486; and 6,444,755, which are hereby incorporated herein by reference. The techniques taught therein are generally applicable to the preparation of the monovinylarene-conjugated diene rubbers discussed below.

"Monovinylarene," as used herein, refers to an organic compound containing a single carbon-carbon double bond, at least one aromatic moiety, and a total of 8 to 18 carbon atoms, such as 8 to 12 carbon atoms. Exemplary monovinylarenes include, but are not limited to, styrene, alpha-methylstyrene, 2-methylstyrene, 3-methylstyrene, 4-methylstyrene, 2-ethylstyrene, 3-ethylstyrene, 4-ethylstyrene, 4-n-propylstyrene, 4-t-butylstyrene, 2,4-dimethylstyrene, 4-cyclohexylstyrene, 4-decylstyrene, 2-ethyl-4-benzylstyrene, 4-(4-phenyl-n-butyl)styrene, 1-vinylnaphthalene, 2-vinylnaphthalene, and mixtures thereof. In one embodiment, the monovinylarene is styrene. A unit of polymer, wherein the unit is derived from polymerization of a monovinylarene monomer, is a "monovinylarene unit."

"Conjugated diene," as used herein, refers to an organic compound containing conjugated carbon-carbon double bonds and a total of 4 to 12 carbon atoms, such as 4 to 8 carbon atoms. Exemplary conjugated dienes include, but are not limited to, 1,3-butadiene, 2-methyl-1,3-butadiene, 2-ethyl-1,3-butadiene, 2,3-dimethyl-1,3-butadiene, 1,3-pentadiene, 3-butyl-1,3-octadiene, and mixtures thereof. In one embodiment, the conjugated diene can be 1,3-butadiene or isoprene. A unit of polymer, wherein the unit is derived from polymerization of a conjugate diene monomer, is a "conjugated diene unit."

A "monovinylarene-conjugated diene block copolymer" is a polymer comprising monovinylarene units and conjugated diene units. The polymer comprises one or more blocks, wherein each block comprises monovinylarene units or conjugated diene units. Any particular block can comprise either or both monovinylarene units or conjugated diene units. If it comprises only one type of units, it can be termed a "monoblock." If it comprises both, it can be a random block, a tapered block, a stepwise block, or any other type of block.

A block is "tapered" when both (a) the mole fraction of conjugated diene units in a first section of the block is higher than the mole fraction of conjugated diene units in a second section of the block, wherein the second section of the block is closer to a given end of the block and (b) condition (a) is true for substantially all sections of the block. (Depending on the size of the sections being considered, condition (a) may not be true for all sections, but if so, will be not true at no more than about the level expected by chance).

A block is "random" when the mole fractions of conjugated diene units and monovinylarene units in a section of the block are substantially the same as the mole fractions of conjugated diene units and monovinylarene units in the entire block. This does not preclude the possibility of sections of the block having regularity (i.e., appearing non-random), but such regular sections will typically be present at no more than about the level expected by chance.

The polymerization process can be carried out in a hydrocarbon diluent at any suitable temperature in the range of from about −100° C. to about 150° C., such as from about 0° C. to about 150° C., and at a pressure sufficient to maintain the reaction mixture substantially in the liquid phase. In one embodiment, the hydrocarbon diluent can be a linear or cyclic paraffin, or mixtures thereof. Exemplary linear or cyclic paraffins include, but are not limited to, pentane, hexane, octane, cyclopentane, cyclohexane, and mixtures thereof, among others.

It is typically desirable that the polymerization process be carried out in the substantial absence of oxygen and water, such as under an inert gas atmosphere.

The polymerization process can be performed in the presence of an initiator. Various organomonoalkali metal compounds are known for use as initiators. As an example, the initiator can have the formula RM, wherein R is an alkyl, cycloalkyl, or aryl radical containing 4 to 8 carbon atoms, such as an n-butyl radical, and M is an alkali metal, such as lithium. In a particular embodiment, the initiator is n-butyl lithium. Other initiators can also be used, including but not limited to sec-butyl lithium and t-butyl lithium.

The amount of initiator employed can depend upon the desired polymer or block molecular weight, as is known in the art and is readily determinable, making due allowance for traces of reaction poisons in the feed streams. In the present context, unless otherwise specified, molecular weight is taken to mean peak molecular weight as measured by gel permeation chromatography (GPC).

The polymerization process can further involve the inclusion of small amounts of randomizers. In one embodiment, the randomizer can be a polar organic compound, such as an ether, a thioether, or a tertiary amine. In another embodiment, the randomizer can be a potassium salt or a sodium salt of an alcohol. The randomizer can be included in the hydrocarbon diluent to improve the effectiveness of the initiator, to randomize at least part of the monovinylarene monomer in a mixed monomer charge, or both. The inclusion of a randomizer can be of value when forming a random or tapered monovinylarene-conjugated diene block of the present polymer.

Exemplary randomizers include, but are not limited to, dimethyl ether, diethyl ether, ethyl methyl ether, ethyl propyl ether, di-n-propyl ether, di-n-octyl ether, anisole, dioxane, 1,2-dimethoxyethane, 1,2-diethoxypropane, dibenzyl ether, diphenyl ether, 1,2-dimethoxybenzene, tetrahydrofuran, potassium tert-amylate, dimethyl sulfide, diethyl sulfide, di-n-propyl sulfide, di-n-butyl sulfide, methyl ethyl sulfide, dimethylethylamine, tri-n-ethylamine, tri-n-propylamine, tri-n-butylamine, trimethylanine, triethylamine, tetramethylethylenediamine, tetraethylethylenediamine, N,N-di-methylaniline, N-methyl-N-ethylaniline, N-methylmorpholine, and mixtures thereof, among others.

In general, some randomizers such as ethers tend to have slower and more controllable randomization effects in the polymerization mixture, and so they are often used when the objective is to achieve a tapered mixed block. On the other hand, some randomizers such as potassium salts generally have much faster and less controllable randomization effects, so they are often used when the objective is to achieve a random mixed block. It should be noted that the function and effect of such randomizers are not limited to the foregoing. Other factors including polymerization steps and conditions may also be manipulated to achieve a desired polymer composition and structure.

When forming a particular block, each monomer charge or monomer mixture charge can be polymerized under solution polymerization conditions such that the polymerization of each monomer charge or monomer mixture charge, to form the particular block, is substantially complete before charging a subsequent charge. "Charging," as used herein, refers to the introduction of a compound to a reaction zone, such as the interior of a reactor vessel.

Though not to be bound by theory, if an initiator is included in a charge, a block will typically form either de novo or by addition to the end of an unterminated, previously-formed, block. Further not to be bound by theory, if an initiator is not included in a charge, a block will typically only form by addition to the end of an unterminated, previously-formed, block.

A coupling agent can be added after polymerization is complete. Suitable coupling agents include, but are not limited to, di- or multivinylarene compounds; di- or multiepoxides; di- or multiisocyanates; di- or multialkoxysilanes; di- or multiimines; di-or multialdehydes; di- or multiketones; alkoxytin compounds; di- or multihalides, such as silicon halides and halosilanes; mono-, di-, or multianhydrides; di- or multiesters, such as the esters of monoalcohols with polycarboxylic acids; diesters which are esters of monohydric alcohols with dicarboxylic acids; diesters which are esters of monobasic acids with polyalcohols such as glycerol; and mixtures of two or more such compounds, among others.

Useful multifunctional coupling agents include, but are not limited to, epoxidized vegetable oils such as epoxidized soybean oil, epoxidized linseed oil, and mixtures thereof, among others. In one embodiment, the coupling agent is epoxidized soybean oil. Epoxidized vegetable oils are commercially available under the tradename Vikoflex™ from Arkema Chemicals.

If coupling is to be performed, any effective amount of the coupling agent can be employed. In one embodiment, a stoichiometric amount of the coupling agent relative to active polymer alkali metal tends to promote maximum coupling. However, more or less than stoichiometric amounts can be used for varying coupling efficiency where desired for particular products.

Following completion of the coupling reaction, if any, the polymerization reaction mixture can be treated with a terminating agent such as water, carbon dioxide, alcohol, phenols, or linear saturated aliphatic mono- or di-carboxylic acids, to remove alkali metal from the block copolymer or for color control.

After termination, if any, the polymer cement (polymer in polymerization solvent) usually contains about 10 to 40 weight percent solids, more usually 20 to 35 weight percent solids. The polymer cement can be flashed to evaporate a portion of the solvent so as to increase the solids content to a concentration of about 50 to about 99 weight percent solids, followed by vacuum oven or devolatilizing extruder drying to remove the remaining solvent.

The block copolymer can be recovered and worked into a desired shape, such as by milling, extrusion, or injection molding. The block copolymer can also contain additives such as antioxidants, antiblocking agents, release agents, fillers, extenders, dyes, etc.

Copolymers formed through the addition of multiple initiator charges are generally referred to as multi-modal. Analytically, this is evidenced by a population of block copolymer molecules having two or more peaks in a histogram of the population's molecular weight distribution. In practice, each injection or charge of a polymerization initiator results in an additional mode. For example, a bimodal block copolymer is formed through the injection of at least two polymerization initiator charges, and so on. As another example, it will be appreciated that multi-modal copolymers can be prepared by blending unimodal copolymers. Alternatively, a multi-modal copolymer can be prepared by incompletely terminating a growing unimodal copolymer at various stages during the polymerization.

In the present invention, the monovinylarene-conjugated diene block copolymers have at least one random mixed block. In the structural charge notation provided herein, this is described as element "C". It will be appreciated that in this notation, a single element "C" may refer to one or more random mixed blocks in series. For example, due to the exothermic nature of the polymerization, it may be desirable to form a random block in a series of steps so that the heat produced by the polymerization can be managed. In cases where multiple identical random mixed blocks are formed sequentially, the resulting segments may be the same as if a single large random mixed block has been formed. In other cases, random blocks of varying compositions can be formed sequentially such that the resulting random segment of the copolymer is not the same as if the entire random segment had been formed in a single step.

Similarly, it will be appreciated that mono-blocks "A" and "B" in the structural charge notation can potentially be divided into multiple smaller charges, having no effect on the resulting copolymer.

Such methods are further illustrated by the discussion provided in the following examples.

EXAMPLES

Materials:

Cyclohexane was dried over activated alumina and stored under nitrogen. n-Butyl lithium initiator ("Li") was received at 15 wt % in cyclohexane and was diluted with cyclohexane to 2 wt %. Tetrahydrofuran (THF) was stored over activated alumina under nitrogen. For instances where potassium tert-amylate ("K" or "KTA") was used, KTA was purchased as a cyclohexane solution from BASF and diluted with cyclohexane to a suitable concentration for dosing reactors as indicated. Styrene and butadiene were purified over activated alumina. Epoxidized soybean oil was used as received.

Reactor:

The polymerizations in Tables 1-3 were performed in a 2-gallon stainless steel reactor. The reactor was equipped with a jacket for temperature control, a double auger impeller, and baffles. Polymerizations in Table 4 were performed in a similar reactor scaled up to 106 gallons.

Polymerizations:

The recipes for the copolymers prepared in this study are listed in Tables 1-4, and are expressed in a parts Per Hundred Monomer (PHM) basis. Parenthetical entries define a single simultaneous charge of both styrene and butadiene. In Tables 1-3, a typical polymerization employed 2000 g of monomers, unless viscosity or heat removal limitations required lower solids. In Table 4, a typical polymerization employed 90,000 g of monomers, unless viscosity or heat removal limitations required lower solids.

Cyclohexane was initially charged to the reactor, followed by THF. The temperature was adjusted to ca. 60° C. and initiator is charged, followed by the first charge of styrene. After polymerization was complete a sample of the first polymerization block is coagulated in nitrogen-sparged isopropanol, filtered, dried, and analyzed by Gel Permeation Chromatography. The polymerization was continued by sequential charges of monomers and/or initiators as desired. The coupling agent was charged and reacted at 100° C. for 15 minutes. The polymer was recovered by solvent evaporation and pelletized with a single screw extruder.

Forming Samples:

In Tables 1-3, pelletized products were extruded into 8' wide 10-mil sheets on a Davis Standard 150S extruder fitted with a Killion sheet line. Plaques of 12 cm×12 cm were die cut from the 10-mil sheet samples to serve as film samples. Using a biaxial orienting machine manufactured by Bruckner Maschinenbau, films were uniaxially stretched in the direction transverse to extrusion at the lowest stretching temperatures that allowed a 5:1 extension. Sheet samples were stretched at a constant 3 cm/sec. In Table 4, 10-mil sheets of pelletized products were oriented directly on commercial scale equipment.

Heat Shrinkability:

Oriented films were immersed in an oil bath for 30 seconds, whereafter the heat shrinkability was calculated.

Natural Shinkage:

Oriented films were placed in an oven set to 40° C. for 7 days, whereafter the natural shrinkage was calculated.

TABLE 1

Comparative Compositions

| Ex. | THF | $i_1$ | $S_1$ | $B_1$ | KTA | $(B_2/$ | $S_2)$ | $(B_3/$ | $S_3)$ | $(B_4/$ | $S_4)$ | $(B_5/$ | $S_5)$ | $S_6$ | CA |
|---|---|---|---|---|---|---|---|---|---|---|---|---|---|---|---|
| 1 | 0.04 | 0.096 | 20 | 14 | 0.0052 | 1.5 | 12.5 | 1.5 | 12.5 | 1.5 | 12.5 | 1.5 | 12.5 | 10 | 0.21 |
| 2 | 0.04 | 0.097 | 30 | 14 | 0.0052 | 1.5 | 12.5 | 1.5 | 12.5 | 1.5 | 12.5 | 1.5 | 12.5 | 0 | 0.21 |
| 3 | 0.04 | 0.090 | 20 | 7.5 | 0.0052 | 3.125 | 12.5 | 3.125 | 12.5 | 3.125 | 12.5 | 3.125 | 12.5 | 10 | 0.25 |

TABLE 2

Comparative Compositions

| Ex. | THF | $i_1$ | $S_1$ | KTA | $(B_1/$ | $S_2)$ | $(B_2/$ | $S_3)$ | $(B_3/$ | $S_4)$ | $(B_4/$ | $S_5)$ | $(B_5/$ | $S_6)$ | $B_6$ | CA |
|---|---|---|---|---|---|---|---|---|---|---|---|---|---|---|---|---|
| 4  | 0.04 | 0.090 | 20 | 0.0044 | 1.5 | 12   | 1.5 | 12   | 1.5 | 12   | 1.5 | 12.0 | 1.5 | 12   | 12.5 | 0.23 |
| 5  | 0.04 | 0.095 | 20 | 0.0044 | 1.5 | 12   | 1.5 | 12   | 1.5 | 12   | 1.5 | 12.0 | 1.5 | 12   | 12.5 | 0.23 |
| 6  | 0.04 | 0.095 | 20 | 0.0052 | 1.7 | 11.5 | 1.7 | 11.5 | 1.7 | 11.5 | 1.7 | 11.5 | 1.7 | 11.5 | 14.0 | 0.25 |
| 7  | 0.04 | 0.095 | 25 | 0.0052 | 1.4 | 11.0 | 1.4 | 11.0 | 1.4 | 11.0 | 1.4 | 11.0 | 1.4 | 11.0 | 13.0 | 0.25 |
| 8  | 0.04 | 0.090 | 15 | 0.0052 | 1.6 | 13.0 | 1.6 | 13.0 | 1.6 | 13.0 | 1.6 | 13.0 | 1.6 | 13.0 | 12.0 | 0.24 |
| 9  | 0.04 | 0.105 | 15 | 0.0052 | 2.1 | 12.0 | 2.1 | 12.0 | 2.1 | 12.0 | 2.1 | 12.0 | 2.1 | 12.0 | 14.5 | 0.25 |
| 10 | 0.04 | 0.112 | 25 | 0.0052 | 1.8 | 10.0 | 1.8 | 10.0 | 1.8 | 10.0 | 1.8 | 10.0 | 1.8 | 10.0 | 16.0 | 0.26 |

TABLE 3

Comparative Compositions

| Ex. | THF | $i_1$ | $S_1$ | $i_2$ | KTA | $(B_1/$ | $S_2)$ | $(B_2/$ | $S_3)$ | $(B_3/$ | $S_4)$ | $(B_4/$ | $S_5)$ | $(B_5/$ | $S_6)$ | $B_6$ | CA |
|---|---|---|---|---|---|---|---|---|---|---|---|---|---|---|---|---|---|
| 11 | 0.04 | 0.043 | 20 | 0.052 | 0.0044 | 1.5  | 12   | 1.5 | 12   | 1.5  | 12   | 1.5 | 12.0 | 1.5 | 12   | 12.5 | 0.24 |
| 12 | 0.04 | 0.055 | 20 | 0.052 | 0.0052 | 1.7  | 11.5 | 1.7 | 11.5 | 1.7  | 11.5 | 1.7 | 11.5 | 1.7 | 11.5 | 14   | 0.25 |
| 13 | 0.04 | 0.067 | 30 | 0.045 | 0.0052 | 2.67 | 15   | 2.67| 15   | 2.66 | 15   |     |      |     |      | 17   | 0.28 |
| 14 | 0.04 | 0.067 | 35 | 0.045 | 0.0052 | 3.4  | 13.4 | 3.3 | 13.3 | 3.3  | 13.3 |     |      |     |      | 15   | 0.28 |

TABLE 4

Comparative Compositions

| Ex. | Recipe |
|---|---|
| 15 | 0.0875i, 15S, 0.0052 KTA, (2B/16.25S)$_4$, 12B, 0.23CA |
| 16 | 0.099i, 15S, 0.0052 KTA, (1.88B/15B)$_4$, 17.5B, 0.25CA |
| 17 | 0.078i, 20S, 0.0052 KTA, (1.88B/15B)$_4$, 12.5B, 0.23CA |
| 18 | 0.095i, 30S, 0.0052 KTA, (1.56B/12.5S)$_4$, 13.8B, 0.25CA |
| 19 | 0.088i, 22.5S, 0.0052 KTA, (2.13B/13.8S)$_4$, 14B, 0.25CA |
| 20 | 0.103i, 30S, 0.0052 KTA, (2B/11.3S)$_4$, 17B, 0.28CA |
| 21 | 0.099i, 15S, 0.0052 KTA, (1.88B/15B)$_4$, 17.5B, 0.25CA |
| 22 | 0.078i, 20S, 0.0052 KTA, (1.88B/15B)$_4$, 12.5B, 0.23CA |
| 23 | 0.105i, 30S, 0.0052 KTA, (1.38B/11.3S)$_4$, 19.5B, 0.28CA |
| 24 | 0.0495i, 20S, 0.059i, 0.0052 KTA, (1.7B/13.75S)$_4$, 18.2B, 0.28CA |
| 25 | 0.085i, 20S, 0.0045 KTA, (1.88B/15B)$_4$, 12.5B, 0.23CA |
| 26 | 0.088i, 22.5S, 0.0052 KTA, (2.13B/13.8S)$_4$, 14B, 0.25CA |

TABLE 5

Comparative Results

| Ex. | Stretch Temp ° C. | Shrink % 70° C. | Shrink % 80° C. | Shrink % 100° C. | Haze | Nat. Shrink % |
|---|---|---|---|---|---|---|
| 1  | 70 | 22.3 | 52.7 | 73.2 | *   | *   |
| 2  | 70 | 19.5 | 51.7 | 74.2 | *   | *   |
| 3  | 70 | 28   | 58   | 67   | 4.6 | *   |
| 4  | 75 | 3    | 33   | 73   | 3.1 | 1.6 |
| 5  | 85 | 2    | 22   | 67   | 7.1 | 1.6 |
| 6  | 75 | 5    | 25   | 73   | 8.3 | *   |
| 5  | 75 | 5    | 25   | 73   | 3.7 | *   |
| 8  | 70 | 15   | 50   | 75   | 3.0 | *   |
| 9  | 75 | 20   | 60   | 75   | 1.7 | *   |
| 10 | 75 | 15   | 55   | 75   | 4.3 | *   |
| 11 | 75 | 0    | 20   | 73   | 4.3 | 0.8 |
| 12 | 80 | 8    | 37   | 73   | 8.9 | *   |
| 13 | 70 | 27   | 55   | 70   | 8.3 | *   |
| 14 | 70 | 25   | 58   | 75   | 6.5 | *   |
| 15 | 80 | 28   | 60   | 75   | 1.8 | *   |
| 16 | 80 | 17   | 45   | 75   | 2.2 | 9.5 |
| 17 | 80 | 10   | 30   | 73   | 1.8 | 4.7 |
| 18 | 90 | 7    | 30   | 73   | 2.3 | *   |
| 19 | 80 | 17   | 45   | 75   | 2.2 | *   |
| 20 | 75 | 22   | 52   | 73   | 2.2 | *   |
| 21 | 85 | 7    | 27   | 74   | 2.5 | 3.5 |
| 22 | 90 | 3    | 28   | 73   | 2.1 | 2.8 |
| 23 | 90 | 3    | 24   | 69   | 1.8 | 6.3 |
| 24 | 90 | 7    | 31   | 73   | 2.0 | 5.1 |
| 25 | 90 | 9.2  | 36.7 | 72.5 | 1.8 | 4.1 |
| 26 | 90 | 14.2 | 45   | 75   | 1.8 | 6.5 |

* No Data

While the compositions and methods of this invention have been described in terms of particular embodiments, it will be apparent to those of skill in the art that variations may be applied to the compositions and methods and in the steps or in the sequence of steps of the methods described herein without departing from the concept, spirit and scope of the invention. For example, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:
1. A block copolymer comprising:
  a monovinylarylene and a conjugated diene coupled block copolymer;
  a random mixed block of monovinylarylene and conjugated diene, wherein the random mixed block comprises 4-9 times as much monovinylarylene as conjugated diene;
  wherein a 2 mil film of the block copolymer oriented at 80° C. or less exhibits the following properties:
    at least 50% shrinkage when immersed for 30 seconds in an oil bath at 80° C.; and
    a natural shrinkage of no more than 5%;
  wherein the block copolymer comprises an initially formed block which is a monovinylarylene block that is 15-30 wt % of the block copolymer; and wherein the block copolymer comprises 20-30 wt % conjugated diene.

2. The block copolymer of claim 1, wherein a 2 mil film of the block copolymer oriented at 80° C. or less has a haze of no more than 5%.

3. The block copolymer of claim 1, wherein a 2 mil film of the block copolymer oriented at 80° C. or less has a shrinkage at 100° C. of at least 70%.

4. The block copolymer of claim 1, wherein a 2 mil film of the block copolymer oriented at 80° C. or less has a shrinkage at 100° C. of at least 75%.

5. The block copolymer of claim 1, wherein the block copolymer is oriented at a temperature of 75° C. or less.

6. The block copolymer of claim 1, wherein the block copolymer is oriented at a temperature of 70° C. or less.

7. The block copolymer of claim 1, wherein the monovinylarylene is styrene and the conjugated diene is 1,3-butadiene.

8. The block copolymer of claim 1, wherein the block copolymer is formed through a charge order: i-A-B-C-CA, where
"i" is a polymerization initiator charge;
"A" is a monovinylarylene charge;
"B" is a conjugated diene charge;
"C" is a mixed charge of monovinylarylene and conjugated diene polymerized under polymerization conditions that result in the random mixed block of monovinylarylene and conjugated diene; and
"CA" is a coupling agent.

9. The block copolymer of claim 1, wherein the block copolymer is formed through a charge order: i-A-C-B-CA, where
"i" is a polymerization initiator charge;
"A" is a monovinylarylene charge;
"B" is a conjugated diene charge;
"C" is a mixed charge of monovinylarylene and conjugated diene polymerized under polymerization conditions that result in the random mixed block of monovinylarylene and conjugated diene; and
"CA" is a coupling agent.

10. The block copolymer of claim 1, wherein the block copolymer is formed through a charge order: i-A-i-C-B-CA, where
"i" is a polymerization initiator charge;
"A" is a monovinylarylene charge;
"B" is a conjugated diene charge;
"C" is a mixed charge of monovinylarylene and conjugated diene polymerized under polymerization conditions that result in the random mixed block of monovinylarylene and conjugated diene; and
"CA" is a coupling agent.

11. A block copolymer comprising:
a monovinylarylene and a conjugated diene coupled block copolymer;
a random mixed block of monovinylarylene and conjugated diene, wherein the mixed block comprises 4-9 times as much monovinylarylene as conjugated diene; and
an initially formed block which is a monovinylarylene block that is 15-30 wt % of the block copolymer;
wherein an oriented 2 mil film of the block copolymer oriented at 100° C. or less exhibits the following properties:
less than 10% shrinkage when immersed for 30 seconds in an oil bath at 70° C.; and
at least 70% shrinkage when immersed for 30 seconds in an oil bath at 100° C.; and
wherein the block copolymer comprises 20-30 wt % conjugated diene.

12. The block copolymer of claim 11, wherein a 2 mil film of the block copolymer oriented at 100° C. or less has a haze of no more than 5%.

13. The block copolymer of claim 11, wherein a 2 mil film of the block copolymer oriented at 100° C. or less has a natural shrinkage of no more than 5%.

14. The block copolymer of claim 11, wherein the block copolymer is oriented at a temperature of 70° C. or less.

15. The block copolymer of claim 11, wherein the monovinylarylene is styrene and the conjugated diene is 1,3-butadiene.

16. The shrink film of claim 11, wherein the block copolymer is formed through a charge order: i-A-C-B-CA where
"i" is a polymerization initiator charge;
"A" is a monovinylarylene charge;
"B" is a conjugated diene charge;
"C" is a mixed charge of monovinylarylene and conjugated diene polymerized under polymerization conditions that result in the random mixed block of monovinylarylene and conjugated diene; and
"CA" is a coupling agent.

17. The shrink film of claim 11, wherein the block copolymer is formed through a charge order: i-A-i-C-B-CA, where
"i" is a polymerization initiator charge;
"A" is a monovinylarylene charge;
"B" is a conjugated diene charge;
"C" is a mixed charge of monovinylarylene and conjugated diene polymerized under polymerization conditions that result in the random mixed block of monovinylarylene and conjugated diene; and
"CA" is a coupling agent.

18. A block copolymer comprising a monovinylarylene and a conjugated diene;
wherein the block copolymer comprises an initially formed block which is a monovinylarylene block that is 15-30 wt % of the block copolymer;
wherein the block copolymer comprises a random mixed block of monovinylarylene and conjugated diene, wherein the mixed block comprises 4-9 times as much monovinylarylene as conjugated diene;
wherein the block copolymer comprises 20-30 wt % conjugated diene;
wherein the block copolymer is coupled;
wherein a 2 mil film of the block copolymer oriented at a temperature of at least 80° C. exhibits the following properties:
less than 17% shrinkage when immersed for 30 seconds in an oil bath at 70° C.;
at least 42% shrinkage when immersed for 30 seconds in an oil bath at 80° C.; and
at least 73% shrinkage when immersed for 30 seconds in an oil bath at 100° C.

* * * * *